350-167
9/9/80    OR    4,221,466    SR

United States Patent [19]
Neumann

[11] 4,221,466
[45] Sep. 9, 1980

[54] COVER PANE FOR SOLAR COLLECTORS

[76] Inventor: Siegmar Neumann, Marsstr. 13,, 8074 Gaimersheim, Fed. Rep. of Germany

[21] Appl. No.: 938,718

[22] Filed: Aug. 31, 1978

[30] Foreign Application Priority Data

Aug. 31, 1977 [DE] Fed. Rep. of Germany ....... 2739201

[51] Int. Cl.² .............................................. G02B 27/00
[52] U.S. Cl. .................................................... 350/167
[58] Field of Search ................ 350/167, 321; 126/270, 126/271

[56] References Cited

U.S. PATENT DOCUMENTS

| 2,277,311 | 3/1942 | Freeman | 126/271 |
| 3,986,491 | 10/1976 | O'Hanlon | 126/271 |
| 4,033,324 | 7/1977 | Eckels | 126/270 |
| 4,057,048 | 11/1977 | Maine | 350/167 |

Primary Examiner—Jon W. Henry
Attorney, Agent, or Firm—Schwartz & Weinrieb

[57] ABSTRACT

A cover pane for a solar collector includes a plurality of solar energy focusing lenses arranged in longitudinal rows with the lenses within adjacent, alternative rows longitudinally offset so as to facilitate the impingement of the solar energy upon the lenses and to prevent lenses within any one row from interfering with the transmission of the solar radiation to the lenses within another row. The columnar arrangement of the lenses also facilitates self-cleaning of the cover.

Each lens element is substantially ovoid or egg-shaped, as seen from a plan view, with the elongated east and west sidewalls serving to maximize early morning, evening, and winter solar radiation collection. In addition, the sidewalls are steeply sloped toward a plane normal or perpendicular to the cover base, while the front walls of the lenses are somewhat flattened. These sloped walls serve to maximize the collection of the solar energy as the sun traverses its trajectory during the solar day, as well as during the winter months when the trajectory of the sun is lower than that during the summer as known in the Northern Hemiphere.

17 Claims, 6 Drawing Figures

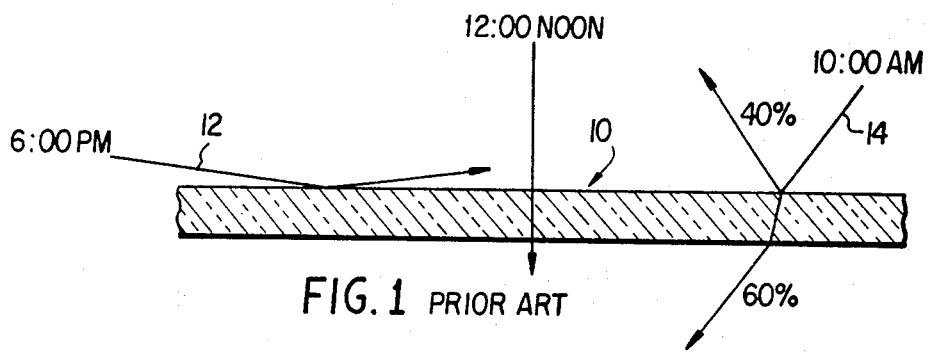
FIG. 1 PRIOR ART
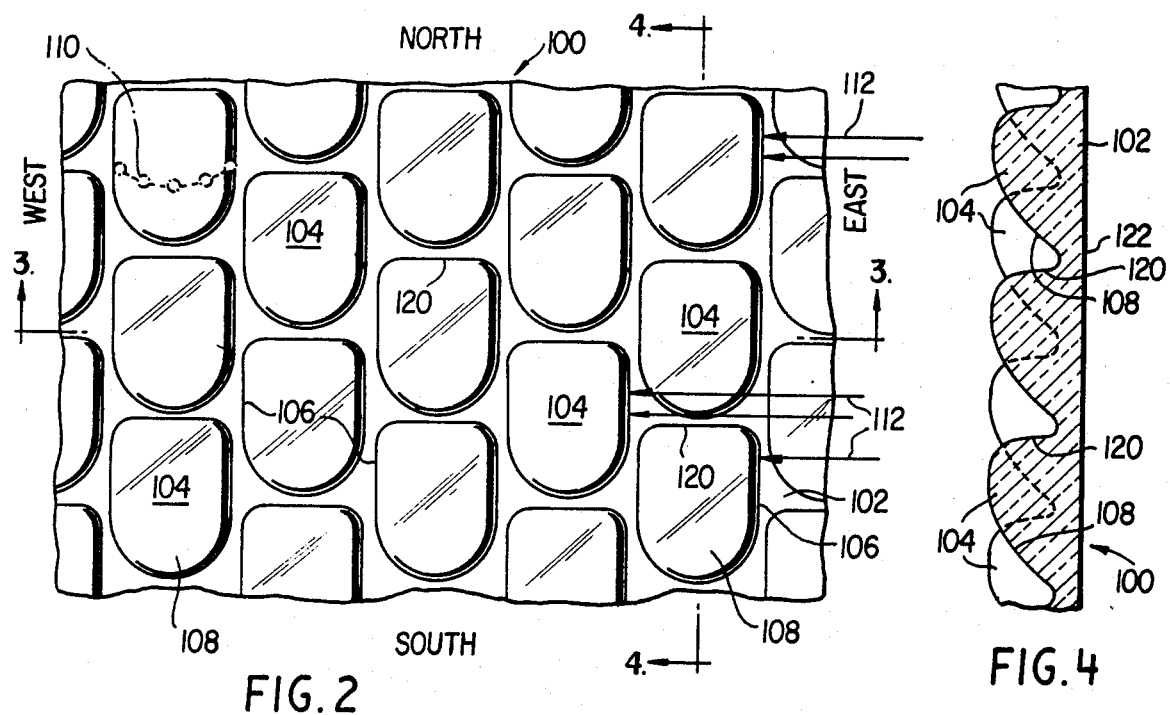
FIG. 2
FIG. 4
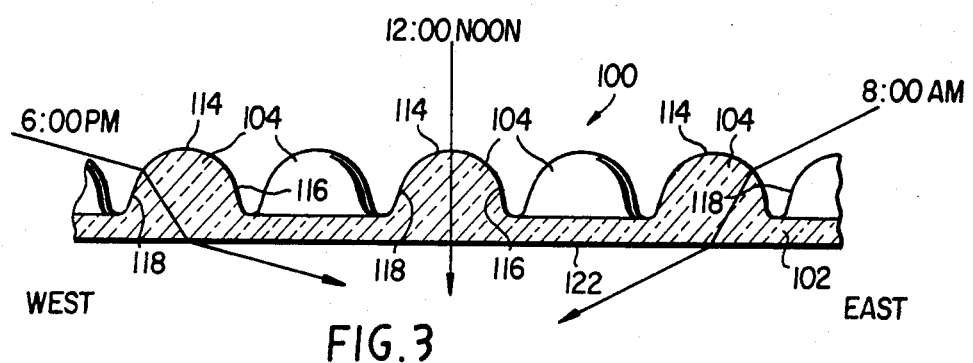
FIG. 3

COVER PANE FOR SOLAR COLLECTORS

FIELD OF THE INVENTION

The present invention relates generally to solar collector apparatus, and more particularly to a cover pane for solar collectors.

BACKGROUND OF THE INVENTION

Solar collector apparatus may be broadly classified into two different types, the first of which is the continuously movable type which is designed to continuously track the movement of the sun throughout the solar day, and the second of which is the stationary type which is fixedly adjusted with respect to the sun's trajectory for a particular solar season of the year. In both cases, the particular latitude of the terrestial location at which the collector is disposed is also taken into account.

In connection with the first type of collector, the efficiency of such collectors is, as may be expected, quite high due to the fact that the collector, being continuously movable along an arc corresponding to the sun's trajectory, is always disposed at an optimum position relative to the sun whereby the maximum solar energy may be collected. Such collector systems, however, employ altazimuth motor-driven tracking devices which are quite expensive and therefore involve considerable initial construction and erection expenditures. Consequently, such devices are only normally employed within sophisticated industrial or commercial systems.

In connection with the second type of collector, while the cost of the systems employing such collectors is substantially less than those systems employing solar tracking collectors, the efficiency of these fixed collectors is quite low. The reason for this may best be appreciated from FIG. 1 of the drawings. As shown in the figure, a conventional solar collector of the stationary type is shown as comprising a flat plate type collector. An operational characteristic of such conventional collectors is that during the early morning and evening hours, such as, for example, at 8:00 A.M. or 6:00 P.M., the solar rays strike the collector plate, generally indicated by the reference character 10, at an angle of incidence approximating 10°, as shown, for example, by solar ray 12. The ray is deflected by the flat plate collector, and consequently, solar energy is not transmitted to the absorber structure of the collector apparatus. It has been determined, in fact, that such flat plate collectors will not normally begin to actually collect a substantial amount of solar energy until the angle of incidence of the solar rays approximates 40° as shown for example by solar ray 14. Under such circumstances, approximately 40% of the solar energy is reflected while 60% of the energy is absorbed. The absorption percentage of course increases as the angle of incidence approaches 90°.

The important consideration to be appreciated by the foregoing is that during early morning and evening hours, virtually no solar energy is able to be absorbed by conventional flat plate, stationary collectors. Similar results will likewise prevail during the winter solar season, as experienced in the Northern Hemisphere, due to the fact that the incidence of the solar energy is acute in a manner similar to early morning and evening hours. As a result of these circumstances, the efficiency of such flat plate, stationary collectors is unacceptably low whereby the commercial acceptance of such collectors is correspondingly low.

OBJECTS OF THE INVENTION

Accordingly, it is an object of the present invention to provide a new and improved cover pane for use in connection with solar collector apparatus.

Another object of the present invention is to provide a new and improved cover pane for use in connection with solar collector apparatus whereby the aforenoted drawbacks of conventional solar collector apparatus will be overcome.

Still another object of the present invention is to provide a new and improved cover pane for use in connection with stationary solar collector apparatus whereby the solar energy absorption or collection efficiency is substantially greater than conventional stationary solar collectors.

Yet another object of the present invention is to provide a new and improved cover pane for use in connection with stationary solar collector apparatus whereby solar energy may be absorbed or collected throughout the solar day including the critically important early morning and evening hours.

A further object of the present invention is to provide a new and improved cover pane for use in connection with stationary solar collector apparatus whereby solar energy may be absorbed or collected throughout the solar year including the critically important autumn, winter, and spring solar seasons as experienced in the Northern Hemisphere.

A still further object of the present invention is to provide a new and improved cover pane for use in connection with stationary solar collector apparatus which is relatively inexpensive and simplistic in structure.

A yet further object of the present invention is to provide a new and improved cover pane for use in connection with stationary solar collector apparatus which is readily able to be mass-produced.

An additional object of the present invention is to provide a new and improved cover pane for use in connection with stationary solar collector apparatus which is essentially self-cleaning and therefore easy to maintain.

SUMMARY OF THE INVENTION

The foregoing and other objectives are achieved in accordance with the present invention through the provision of a cover pane, for use in connection with solar collector apparatus, which comprises a plurality of solar energy focusing lenses arranged in longitudinal rows with the lenses within alternative rows longitudinally offset with respect to the lenses within the adjacent rows so as to facilitate the impingement of the solar energy upon all of the lenses and to prevent the lenses of a particular row from interfering with the lenses within an adjacent row.

Each lens element is substantially ovoid or egg-shaped as seen from a plan view, and this configuration is seen to be critically important as the elongated east and west oriented sidewalls of the lenses serve to maximize the absorption or collection of the solar energy during the early morning and evening hours, as well as during the winter period of the solar year. In addition, the sidewalls are steeply sloped more towards the normal or perpendicular than the sidewalls of, for example, a spherical lens, and this structural feature also serves to maximize the solar energy absorption or collection during the morning and evening hours of the solar day, and particularly during the winter period of the solar year due to the lower trajectory of the sun during such period.

BRIEF DESCRIPTION OF THE DRAWINGS

Various other objects, features, and attendant advantages of the present invention will be more fully appreciated as the same becomes better understood from the following detailed description when considered in conjunction with the accompanying drawings, in which like reference characters designate like or corresponding parts throughout the several views, and wherein:

FIG. 1 is a side elevation of a conventional flat plate type solar collector cover pane;

FIG. 2 is a plan view of a cover pane constructed in accordance with the present invention and showing its cooperative parts;

FIG. 3 is a cross-sectional view of the cover pane of FIG. 2 taken along the line 3—3 of FIG. 2;

FIG. 4 is a cross-sectional view of the cover pane of FIG. 2 taken along the line 4—4 of FIG. 2;

DETAILED DESCRIPTION OF THE ILLUSTRATED EMBODIMENTS

Figure 5:
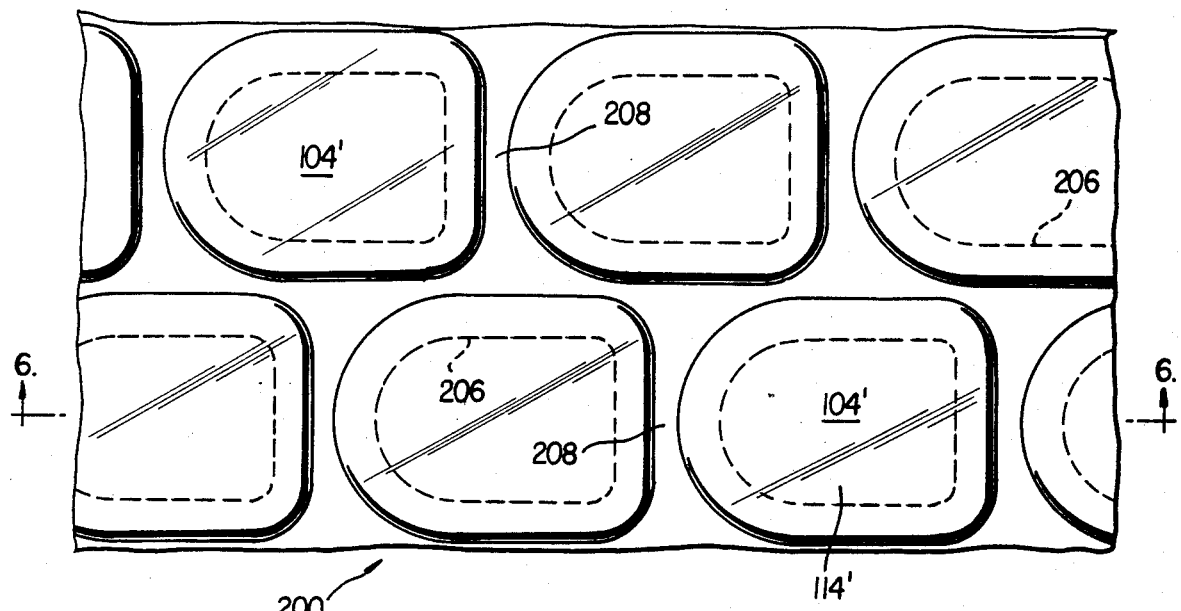
FIG. 5 is a view similar to that of FIG. 2, showing however an improved embodiment of the cover pane of the present invention.

Referring now to the drawings, and more particularly to FIGS. 2-4 thereof, the solar collector cover pane of the present invention is shown and generally designated by the reference character 100. The cover pane is seen to comprise a base plate 102 and a plurality of lens elements 104 integrally formed within the upper portion of the pane.

As best seen in the plan view of FIG. 2, each lens is substantially ovoid or egg-shaped in configuration, and the lenses are disposed within longitudinally extending rows. In use, the solar collector, and particularly the base 102, is ideally disposed in the orientation shown such that the rows of the lenses extend in the due North-South direction. The lens elements 104 have longitudinally extending sidewalls 106 which likewise extend substantially in the North-South direction, and the lenses further comprise rounded, Southerly oriented front walls 108.

The significance of the aforenoted configurations of each of the lens elements may be appreciated from FIG. 2 wherein the trajectory of the sun throughout the solar day is schematically illustrated at 110. As is well known, the sun effectively traverses a trajactory which extends from East to West and which also passes through a portion of the sky which is disposed southerly of the zenith. During the early morning hours of the solar day, for example, the solar energy impinges upon the East sidewall of each lens element as schematically shown at 112 in FIG. 2. Consequently, due to the elongation of the sidewalls, as opposed to the limited extent of the most easterly disposed sidewall portion of a spherical lens element, the lens elements of the present invention maximize the amount of solar energy to be absorbed or collected. Similar phenomena likewise occur with respect to the West sidewalls of the lens elements during the evening hours.

Another critical structural feature of the lens elements of the cover pane of the present invention is best appreciated from FIG. 3. As seen in the FIGURE, the lens elements 104 are convex so as to project upwardly from the cover pane base 102, and the uppermost section of each lens is spherical, as indicated at 114. The eastwardly and westwardly disposed sidewalls 116 and 118, respectively, of each lens element is not a continuation of the spherical section 114, but to the contrary, the sidewalls 116 and 118 are sloped downwardly in a relatively steep manner toward a normal or perpendicular plane relative to base 102.

The significance of the sidewall structure of the lens elements resides in the fact that unlike the flat plate 10 of FIG. 1, the sidewalls 116 and 118 of the cover pane of the present invention are able to intercept the solar energy impinging thereon with a low angle of incidence, as opposed to such energy being deflected and lost as is the case with the flat plate 10. The solar energy is of course refracted within the cover 100 and transmitted to the solar collector absorber disposed beneath the cover pane and not shown. Consequently, the solar energy present during the early morning and evening hours is able to be commercially harnassed and utilized within particular processing equipment associated with the collector.

It is also seen from FIGS. 2 and 4 that in addition to the southerly disposed front walls 108 of the lens elements being rounded so as to more or less correspond to the solar trajectory, the slope of the front walls 108 is less than that normally characterized by, for example, a sidewall portion of a spherical lens. This structural feature is provided in order to accommodate the solar energy emitted by the sun during the middle part of the day when the sun is near or at its summit. It is to be noted that depending upon the latitude of the terrestial location at which the collector is being employed, the collector will initially be adjusted so as to have a predetermined inclination, and this is usually accomplished so that the maximum incidence of the solar energy impinges upon the collector at noon of the solar day.

In a manner similar to the southerly disposed front walls 108 of the lens elements for intercepting the solar energy directed thereon, it is also noted that as no solar energy is incident upon the north wall 120 of each lens element, when the collector is disposed at a terrestial location within the Northern Hemisphere, the north walls 120 of the lens elements may be contoured so as to extend sharply downwardly in a manner similar to sidewalls 116 and 118. Such rear walls 120 merely serve to define the rear portion of each lens element and to connect the same to the base 102. The sharp slope of the rear walls also serves to prevent interference with respect to impinging solar energy for adjacent lens elements. In fact, in order to minimize such interference, it is also seen from FIG. 2 that the lens elements within adjacent rows are longitudinally offset with respect to each other. In this manner, as schematically seen from the impinging solar radiation 112, the solar energy is able to impinge upon all of the lens elements with relatively little interference between elements, particularly during the early morning and evening hours. During the middle hours of the solar day, when the sun is disposed in the southeast and southwest directions relative to the collector, the height of the sun is sufficient whereby the impinging radiation upon the northernmost lens elements is not blocked by means of the southern elements.

As is well known, the amount of solar energy able to be collected by any solar collector varies considerably throughout the solar year due to the variance in the incidence of the solar rays. The collector of the present invention is adapted to be mounted upon an adjustable support frame whereby the angle of incidence of the support frame, not shown, and the collector is able to be periodically adjusted in order to correspond to the different solar seasons. Ideally then, the angle of incidence of the support frame and collector should be adjusted so as to maximize solar energy collection at noon of Mar. 21, June 21, Sept. 21, and Dec. 21. Alternatively, the support frame and collector may be adjusted only initially to a particular position whereby the solar energy collected is maximized at a predetermined time of the solar year in order to accommodate maximum energy needs, such as, for example, heating in the winter months or air-conditioning in the summer months. No further adjustments need thereafter be made. It is noted, however, that the solar energy to be collected will only be maximized during that period of the solar year to which the collector has been positionally adjusted.

For example, if the collector has been adjusted so as to maximize collection at noon of June 21 in order to meet summer air-conditioning needs, then the solar energy collected during the winter months will not be maximized, but this may be sufficient for the particular climate characteristics of that terrestial location. It is nevertheless noted that with the collector of the present invention, and particularly in view of the structural features of the east, west, and south walls of the lens elements, the solar energy that will be collected during the winter period will nevertheless substantially exceed the amount of solar energy collected during the winter months by means of the conventional flat plate collector of FIG. 1. This is seen to be due to the fact that, in a manner similar to the early morning or evening hours, the solar radiation characteristic of the winter months has a relatively low angle of incidence. However, in lieu of being deflected, as such radiation would be by means of the flat plate collector of FIG. 1, the cover of the present invention, with the lens elements 104, serves to collect such energy and prevent the same from being lost.

The cover shown in FIG. 2 is adapted to be utilized under conditions wherein the lenses 104 have their front walls 108 pointed due South. In the instance that the exposure of the edifice, for example, within which the collector is to be utilized, does not permit the cover and lenses to be directed due South, then the cover structure may be modified so as to permit the orientation of the lenses relative to the cover base to be altered. In this manner, the lenses 104 will be fixedly secured and integrally formed with the base 102, however, the longitudinal rows of lenses will not correspond with the longitudinal extent of the base 102. The modification however will nevertheless permit the lenses to be directed in the North-South direction with the front walls 108 still directed due South, although the base 102 and the collector structure may be askewed with respect to the North-South directional axis. In order to accommodate all possible directional contingencies or exposures of the edifice, a plurality of cover panes may be mass-produced with the lenses disposed in five different orientations relative to the base 102. In particular, one modification may be that illustrated wherein the lenses and base are both aligned in the NOrth-South direction, and with the front walls 108 of the lenses disposed due South. Another embodiment would have the lenses disposed in the same due South direction, but the base 102 disposed toward the Southeast, while a third embodiment would have the base disposed toward the Southwest. Fourth and fifth embodiments would have the bases disposed East-Southeast and West-Southwest, respectively.

As the cover of the present invention is not a flat plate as shown in FIG. 1, it is also to be appreciated that the structure of the cover of the present invention serves to render the same self-cleaning. Due to the presence of the convex lens elements 104, moist leaves and paper will not tend to cling to the cover whereby interference with the impinging energy is eliminated. In addition, due to the disposition of the lens elements within the aforenoted rows, the same defined channels between adjacent rows. As the cover and collector are to be disposed upon an inclined support frame, rain will rapidly flow through the channels so as to carry off dirt and dust particles. It has been experienced that the flow velocity of the draining water through the channels is faster than droplet velocity upon, for example, a flat plate collector.

Figure 6:
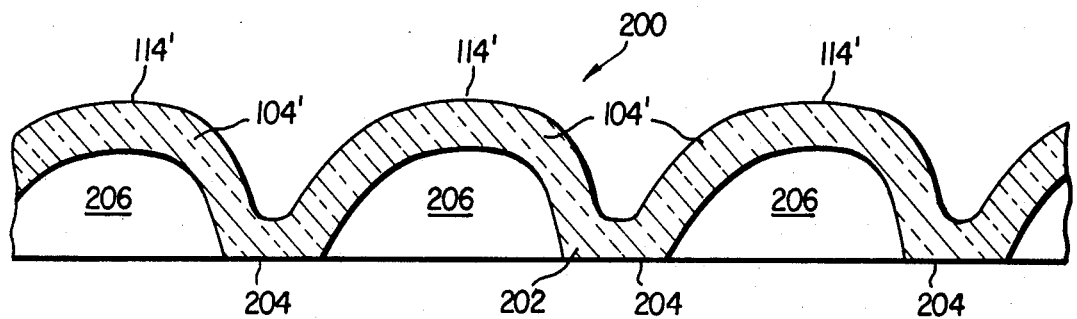
FIG. 6 is a cross-sectional view of the cover pane of FIG. 5 as taken along the line 6—6 of FIG. 5.

As may well be appreciated, when the cover pane of a solar collector is disposed above the absorber of the collector, considerable heat is developed within the air space defined between the cover and absorber. On occasion, it has been experienced that the heated atmosphere within the confined air space may exert sufficient pressure upon the cover pane such that the same may crack and failure develop. In order to prevent this development, the cover pane of FIGS. 5 and 6 was developed, the pane being designated generally by the reference character 200. The pane 200 is similar to the pane 100 with the major difference therebetween residing in the fact that in lieu of the planar bottom surface 122 of base 102, the base 202 of pane 200 comprises planar portions 204 and concavities 206 interposed therebetween. The concavities 206 correspond to the convex, spherical portions 114' of the lenses 104', while the planar portions 204 are longitudinally aligned with troughs 208 defined between successive lens elements 104'.

It has been experienced that the aforenoted cover pane structure results in an improved thermal and pressure stress pattern for the cover pane of the present invention, and consequently, cracking of the same has been prevented under operative conditions.

Obviously, many modifications and variations of the present invention are possible in light of the aforenoted teachings. It is therefore to be understood that within the scope of the appended claims, the present invention may be practiced otherwise than as specifically described herein.

What is new and desired to be secured by letters patent of the United States of America, is:

1. A cover pane for use in conjunction with a solar collector, comprising:
   a base member; and
   a plurality of lens elements fixedly secured upon said base member,
   each of said lens elements being substantially ovoid or egg-shaped with the elongated sides thereof disposed toward the East and West directions so as to maximize solar radiation interception and collection during morning and evening hours and the uppermost portion of each of said lens elements is spherical, the front wall of each of said lens elements is rounded and disposed toward the South direction, and the slope of said front wall of each of said lens elements is shallower than that of said spherical portion of each of said lens elements so as to maximize the solar radiation interception and collection during the middle hours of the solar day.

2. The cover pane as set forth in claim 1, wherein:

each of said lens elements comprises a convex structure projecting upwardly from said base.

3. The cover pane as set forth in claim 2, wherein:

the front wall of each of said lens elements is rounded and disposed toward the South direction; and the slope of said front wall of each of said lens elements is shallower than that of said spherical portion of each of said lens elements so as to maximize the solar radiation interception and collection during the middle hours of the solar day.

4. The cover pane as set forth in claim 1, wherein:

the Northerly directed walls of each of said lens elements is sloped sharply downwardly toward said base so as to minimize solar radiation impingement interference between said lens elements.

5. The cover pane as set forth in claim 1, wherein:

said lens elements are disposed in longitudinally extending rows.

6. The cover pane as set forth in claim 5, wherein:

the lens elements within adjacent rows are longitudinally offset with respect to the elements within adjacent rows so as to minimize solar radiation impingement interference between said lens elements.

7. The cover pane as set forth in claim 5, wherein:

said rows of lens elements define channels therebetween for conducting rainwater therethrough, whereby said rainwater drained from said cover pane removes entrained dirt and dust particles thereby rendering said pane self-cleaning.

8. The cover pane as set forth in claim 2, wherein:

the undersurface of said base member comprises a plurality of concavities which correspond to the convex configurations of said lens elements so as to establish favorable thermal and pressure stress characteristics within said pane so as to prevent failure thereof.

9. The cover pane as set forth in claim 2, wherein:

the sidewalls of each of said lens elements defining said East and West sides of each of said lens elements is sloped sharply downwardly so as to deviate from the spherical curvature of said uppermost portion of each of said lens elements and approach a plane normal or perpendicular to said base, whereby the solar radiation interception and collection is maximized still further.

10. A cover pane for use in conjunction with a solar collector, comprising:

a base member; and a plurality of lens elements fixedly secured upon said base member, each of said lens elements being substantially ovoid or egg-shaped with the elongated sides thereof disposed toward the East and West directions so as to maximize solar radiation interception and collection during morning and evening hours, the uppermost portion of each of said lens elements defining said East and West sides of each of said lens elements is sloped sharply downwardly so as to deviate from the spherical curvature of said uppermost portion of each of said lens elements and approach a plane normal or perpendicular to said base, whereby the solar radiation interception and collection is maximized still further.

11. The cover pane as set forth in claim 10, wherein:

each of said lens elements comorises a convex structure projecting upwardly from said base.

12. The cover pane as set forth in claim 11, wherein:

the front wall of each of said lens elements is rounded and disposed toward the South direction; and the slope of said front wall of each of said lens elements is shallower than that of said spherical portion of each of said lens elements so as to maximize the solar radiation interception and collection during the middle hours of the solar day.

13. The cover pane as set forth in claim 10, wherein:

the Northerly directed walls of each of said lens elements is sloped sharply downwardly toward said base so as to minimize solar radiation impringement interference between said lens elements.

14. The cover pane as set forth in claim 10, wherein:

said lens elements are disposed longitudinally extending rows.

15. The cover pane as set forth in claim 14, wherein:

the lens elements within adjacent rows are longitudinally offset with respect to the elements within adjacent rows so as to minimize solar radiation impingement interference between said lens elements.

16. The cover pane as set forth in claim 14, wherein:

said rows of lens elements define channels therebetween for conducting rainwater therethrough, whereby said rainwater drained from said cover pane removes entrained dirt and dust particles thereby rendering said pane self-cleaning.

17. The cover pane as set forth in claim 11, wherein:

the undersurface of said base member comprises a plurality of concavities which correspond to the convex configurations of said lens elements so as to establish favorable thermal and pressure stress characteristics within said pane so as to prevent failure thereof.

* * * * *